United States Patent
Tachibana

(10) Patent No.: US 9,996,160 B2
(45) Date of Patent: Jun. 12, 2018

(54) METHOD AND APPARATUS FOR GESTURE DETECTION AND DISPLAY CONTROL

(71) Applicant: Sony Corporation, Tokyo (JP)

(72) Inventor: Makoto Tachibana, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 713 days.

(21) Appl. No.: 14/183,171

(22) Filed: Feb. 18, 2014

(65) Prior Publication Data
US 2015/0234467 A1 Aug. 20, 2015

(51) Int. Cl.
*G06F 3/01* (2006.01)
*G06F 3/0485* (2013.01)
*G06F 3/0486* (2013.01)

(52) U.S. Cl.
CPC ............ *G06F 3/017* (2013.01); *G06F 3/0485* (2013.01); *G06F 3/0486* (2013.01)

(58) Field of Classification Search
CPC .......... G06F 3/01; G06F 3/0485; G06F 3/017; G06F 3/0486
See application file for complete search history.

(56) References Cited

U.S. PATENT DOCUMENTS

| | | |
|---|---|---|
| 2010/0125815 A1 | 5/2010 | Wang et al. |
| 2011/0193778 A1 | 8/2011 | Lee et al. |
| 2012/0204133 A1 | 8/2012 | Guendelman et al. |
| 2013/0055150 A1* | 2/2013 | Galor .............. G09G 5/34 715/784 |
| 2013/0127738 A1 | 5/2013 | Miller et al. |
| 2015/0153833 A1* | 6/2015 | Pinault ............ G06F 3/011 345/156 |

FOREIGN PATENT DOCUMENTS

| | | |
|---|---|---|
| EP | 2 597 548 A2 | 5/2013 |
| WO | WO 2011/134112 A1 | 11/2011 |
| WO | WO 2014/009561 A2 | 1/2014 |

OTHER PUBLICATIONS

Extended European Search Report dated Jul. 7, 2015 in Patent Application No. 14164542.4.

* cited by examiner

*Primary Examiner* — Jeffrey A Gaffin
*Assistant Examiner* — Ayesha Huertas Torres
(74) *Attorney, Agent, or Firm* — Oblon, McClelland, Maier & Neustadt, L.L.P.

(57) ABSTRACT

A device includes a display and one or more motion sensors configured to track positions of two or more feature points of an object when the object is used to perform a gesture at a position remote from the display, and generate, based on the tracked positions of the feature points, sequential position data that indicates a relative position of the feature points with respect to each other and to the display. The device includes circuitry configured to determine, based on the sequential position data, whether the gesture corresponds to one of a plurality of predetermined input operations, and execute processing related to the predetermined input operation when a correspondence is determined. The circuitry is configured to determine whether the gesture corresponds to the predetermined input operation based on variations in the relative positions of the feature points with respect to each other and to the display.

13 Claims, 18 Drawing Sheets

METHOD AND APPARATUS FOR GESTURE DETECTION AND DISPLAY CONTROL

BACKGROUND

Technical Field

The present disclosure relates to a method and apparatus of detecting hand gestures with respect to a display apparatus, and the execution of processing based on the detected gesture.

Description of Related Art

Conventionally, a mouse, a pen, a touch panel, etc., may be referred to as pointing devices with which a user may perform input operations with respect to an electronic device that includes a display screen. These input elements are suitable when a user is relatively close to the display screen. For example, a stylus or finger may be used to make direct contact with a touch panel display implemented in a handheld device such as a smartphone.

On the other hand, for display devices having a relatively large display screen, such as a television receiver, pointing devices are difficult to use because a user typically operates the relatively large devices from a position away from the display screen. For such relatively large display devices, wireless devices such as remote controllers that transmit infrared signals are typically utilized for control of the display devices.

However, operation by a remote controller greatly differs from an intuitive user operation such as the touch operation, which is currently common in smartphones and the like. For example, a user must search for a button on the remote control corresponding to the desired operation rather than performing an intuitive motion that causes the desired operation to be executed. Moreover, it is troublesome to keep a remote controller in hand, and a user may often lose the remote controller and therefore be unable to control the device remotely.

In recent years, a three-dimensional (3D) gesture detection technique of realizing a pointer function by detecting a 3D motion of a user's hand and/or finger has been proposed. A motion detection apparatus implementing the aforementioned 3D gesture detection technique may include a distance image sensor, which may include an image sensor (e.g., CMOS sensor) and infrared ray light emitting diode (LED).

In 3D gesture detection, although it is anticipated that intuitive operations can be performed, the action corresponding to clicking with a mouse and a scroll function becomes an important control element. In conventional 3D gesture detection techniques, for example, the change of the position of a hand of a direction perpendicular to a screen may be detected by the distance image sensor, and the detected gesture may be determined to correspond to a clicking action (e.g., as in a click performed with a mouse).

However, when a user tries to perform the foregoing clicking action by pressing the hand toward the display screen, it is difficult to make the gesture action completely to the depth direction of the display screen. That is, the action which presses a hand into the specific axial direction of a sensor will be unavoidably accompanied by movement of the hand with respect to another axial direction of the sensor. As a result, a motion of a hand in a direction (the x-axis or y-axis direction, relative to the axis perpendicular to the screen) parallel to a display screen is detected, and this detected motion is determined to correspond to a scroll operation. However, the scroll operation may not have been desired when the user performed the action corresponding to the click operation. Therefore, the user's intended operation cannot be detected correctly. In fact, it is often incorrectly detected as a different input operation.

Moreover, a gesture action in the depth direction of a display screen places a heavier physical burden on the user compared with vertical and horizontal actions because the user must utilize more joints to perform the gesture.

Regarding a scroll function, scroll actions may be detected in conventional techniques by tracking a movement of a target object (e.g., a user's hands) in arbitrary directions relative to the display. However, when the target object reaches the boundaries of the detectable range of the sensors, a reverse direction scroll is detected when the target object is returned back to original direction, which is not user friendly.

SUMMARY

In light of the foregoing problems with gesture detection for control of display devices, the disclosure recognizes the necessity for a gesture detection method and apparatus which correctly detects instruction operations without undue burden on the user.

In one embodiment, a device includes a display and one or more motion sensors configured to track positions of two or more feature points of an object when the object is used to perform a gesture at a position remote from the display. The one or more motion sensors are configured to generate sequential position data based on the tracked positions of the feature points, wherein the sequential position data indicates a relative position of the feature points with respect to each other and to the display during a time period corresponding to the gesture. The device includes a memory that stores the sequential position data received from the one or more motion sensors. The device includes circuitry configured to determine, based on the sequential position data, whether the gesture corresponds to one of a plurality of predetermined input operations, and execute processing related to the predetermined input operation when a correspondence between the gesture and the predetermined input operation is determined. The circuitry is configured to determine whether the gesture corresponds to the predetermined input operation based on variations in the relative positions of the feature points with respect to each other and to the display.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
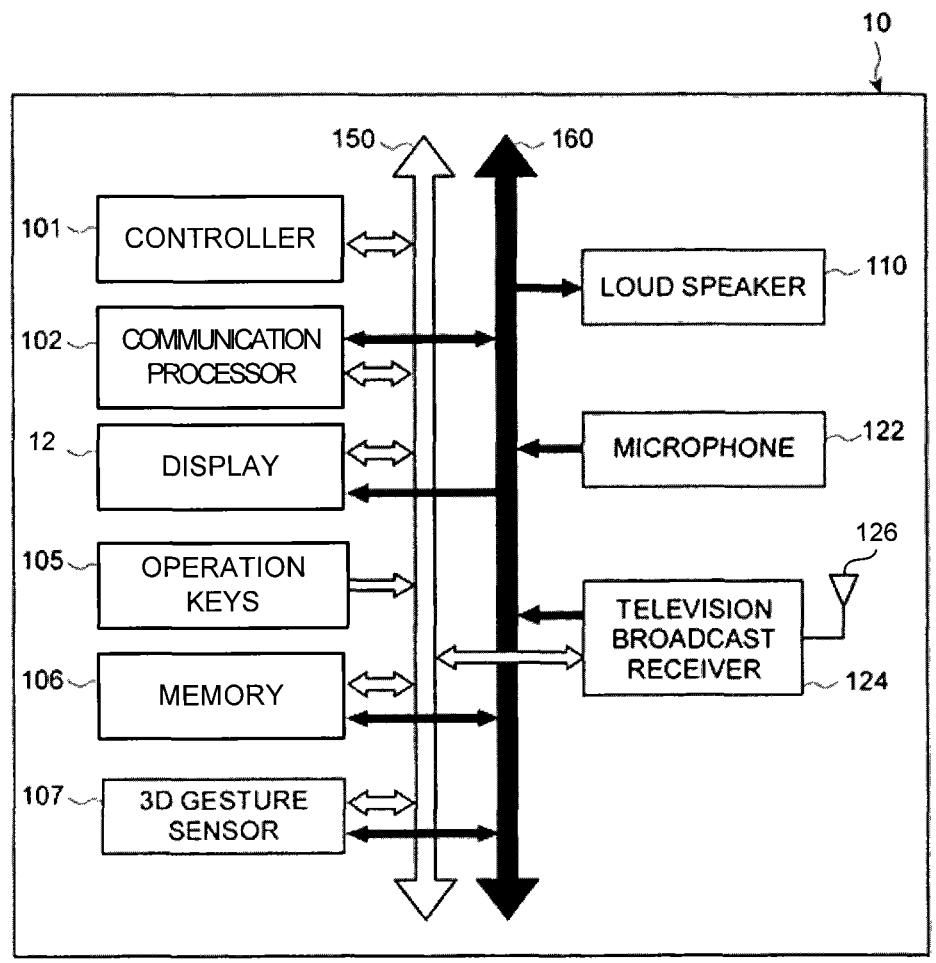
FIG. 1 illustrates a non-limiting example of a block diagram of a display apparatus, according to certain embodiments.

Referring now to the drawings, wherein like reference numerals designate identical or corresponding parts throughout the several views.

Referring first to FIG. 1, FIG. 1 illustrates a non-limiting example of a block diagram which shows a structural example of a display apparatus 10, according to certain embodiments. The display apparatus 10 in FIG. 1 includes control line 150 and data line 160, and includes the following various functional parts connected to these lines: a controller 101, a communication processor 102, a display 12, operation keys 105, memory 106, 3D gesture sensor 107, loud speaker 110, microphone 122, and television broadcast receiver 124 connected to antenna 126. The exemplary display 12 may, in certain embodiments, be a television receiver, a personal computer (PC), a tablet, or the like. However, the present disclosure is not limited to above examples, and the processing described herein may be adapted for any apparatuses that have a display screen.

In FIG. 1 the communication processor 102 connects the display apparatus 10 to communication networks, such as the Internet, by wired or wireless connections for transmitting and receiving various data.

The display 12 manages the display interface of the display apparatus and displays a display image on a display screen. In one embodiment of the present disclosure, the display 12 may be implemented as a liquid crystal display (LCD) or an organic electroluminescent display (OEL). In addition to displaying still and moving image data, the display 12 may display operational inputs, such as numbers or icons, which may be used for control of the display apparatus 20. The display 12 may additionally display a graphical user interface with which a user may control aspects of the display apparatus 10. Further, the display 12 may display characters and images received by the communication processor 102 and/or stored in the memory 106 or accessed from an external device on a network. For example, the display apparatus 10 may access a network such as the Internet, and display text and/or images transmitted from a Web server.

The memory 106 may include, e.g., Read Only Memory (ROM), Random Access Memory (RAM), or a memory array comprised of a combination of volatile and non-volatile memory units. The memory 106 may be utilized as working memory by the display apparatus 10 while executing the processing and algorithms of the present disclosure. Additionally, the memory 106 may be used for long-term storage, e.g., of images and information related thereto, or the storage of executable computer program instructions corresponding to processing algorithms described herein. In certain non-limiting embodiments of the present disclosure, the memory 106 stores instructions for the execution of an Operating System (OS) program.

The speaker 110 in FIG. 1 is an electro-acoustic transducer which converts an electric signal into a sound for audio output.

The microphone 122 detects surrounding audio (e.g., voice inputs), and converts the detected audio into an audio signal. The audio signal may then be output to the controller 101 for further processing.

The television broadcasting receiver 124 receives an image and audio signal from the antenna 126 or a cable (e.g., a coaxial, fiber optic, etc. cable from a satellite or cable television provider), and regenerates imagery and audio for output by the display apparatus 10.

The television broadcasting receiver 124 is not an essential element to a display apparatus. For example, the display apparatus 10 may output images, interfaces, display data, etc. stored in memory, received from a network, or received as output from another video device (e.g., a digital video disc player or other similar device capable of outputting data that may be processed for display).

Figure 2:
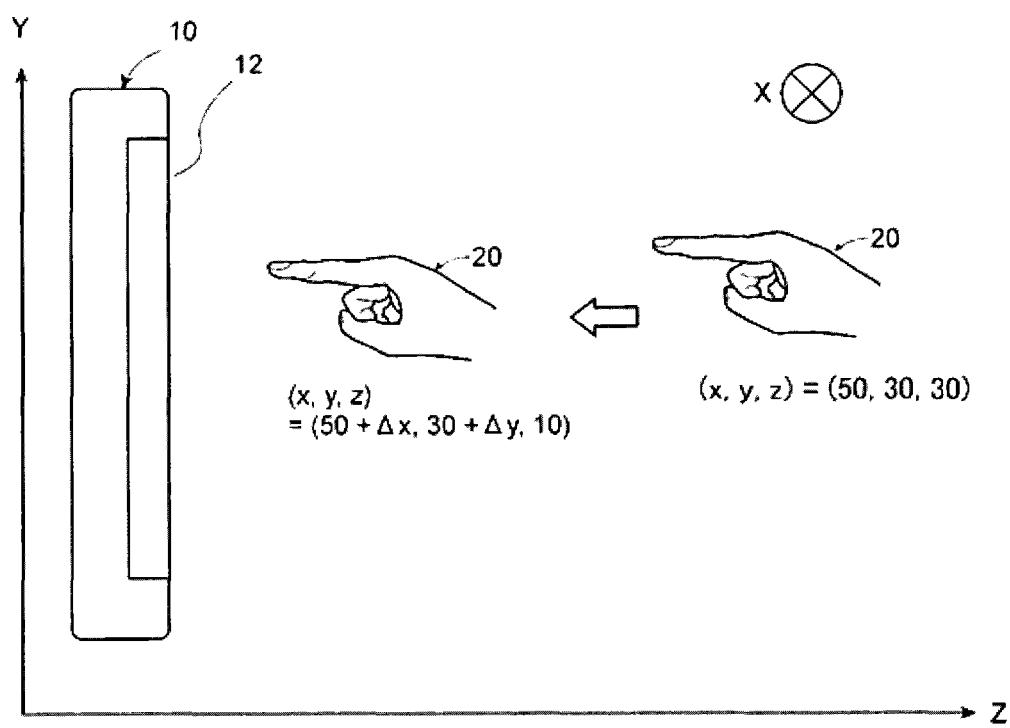
FIG. 2 illustrates a non-limiting example of a hand of a user being a detection target of a display apparatus using a 3D gesture sensor, according to certain embodiments.

Next, FIG. 2 illustrates a non-limiting example of a hand of a user being a detection target of a display apparatus provided with 3D gesture sensor, and a corresponding detection space, according to certain embodiments.

Referring now to FIG. 2, the detection space in this example is set in front of (i.e., the viewing space) of the display 12. For the purposes of this example, the y-axis of the display 12 is the up-down direction and x-axis is the left-right direction relative to the display 12 surface. A direction vertical to the display 12 is the z-axis. In this case, a direction perpendicular to the display 12 corresponds to the z-axis direction of an associated motion sensor.

In certain embodiments, a click operation is identified by the action of a user pressing the hand 20 in a direction toward the display 12. As mentioned previously, it is difficult in practice for a user to accurately press the hand exactly toward the z-axis direction of a motion sensor (and correspondingly, the depth direction of a display). In other words, the action of user pressing the hand 20 in the z-axis direction may inevitably be accompanied by a movement of the hand 20 in the x-direction and y-direction. For example, the coordinates of the hand 20 when moving toward the display 12 in this case may be accompanied by motions ($\Delta x, \Delta y$) in the x-axis and the y-axis directions like $(x,y,z)=(50,30,30)$ to $(50+\Delta x, 30+\Delta y, 10)$.

Hereinafter, specific exemplary processes of gesture determinations according to certain embodiment of this disclosure will be demonstrated. For the purposes of the present disclosure, when a gesture involves using the user's index finger, the feature points of not only one point of the tip of an index finger but another finger or a hand may be collectively utilized. Further, while the examples discussed herein perform detection processing with respect to a user's hand, one of ordinary skill in the art will appreciate that the gesture detection processes described herein may be adapted to detect gestures and feature points related to other objects.

Figure 3:
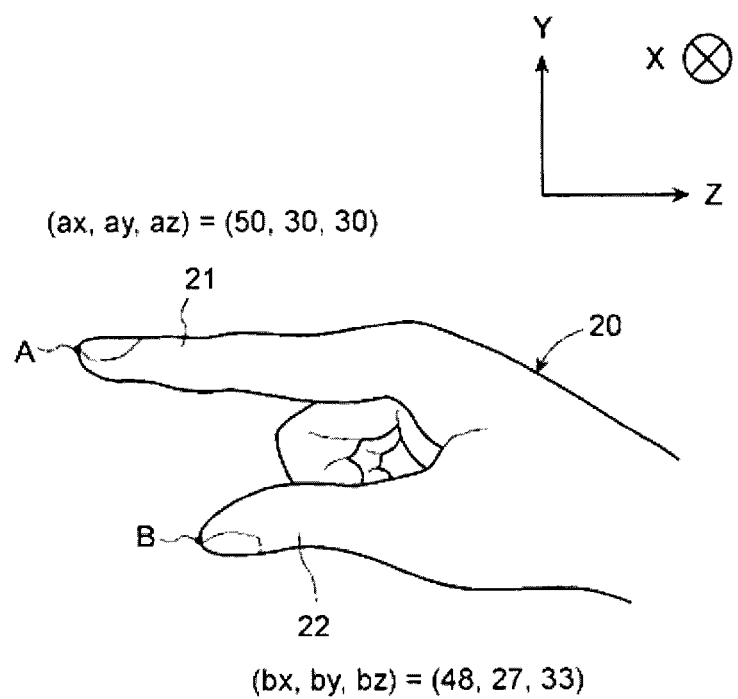
FIG. 3 illustrates a non-limiting example of a detection target of a 3D gesture, according to certain embodiments.

Next, FIG. 3 illustrates a non-limiting example of a detection target of a 3D gesture, according to certain embodiments.

Referring now to FIG. 3, index finger 21 and thumb 22 may be detected as feature points of the hand 20, which is the detection target of the 3D gesture in this example. Usually, when performing a scroll operation of a screen using a touch-panel function (especially scroll operations in the horizontal direction) it is rare for the fingertip of, e.g., index finger 21 that is performing the scroll operation to move independently with respect to the motion of the hand 20. That is, it is rare for a finger to move with respect to the joint connection on the hand when a scroll operation is performed. Instead, the finger usually moves by rotating the hand at the wrist or alternatively rotating the lower arm about the elbow. Regarding the perpendicular direction, although the hand 20 itself moves or only a fingertip may move, both motions may be performed naturally.

Figure 4:
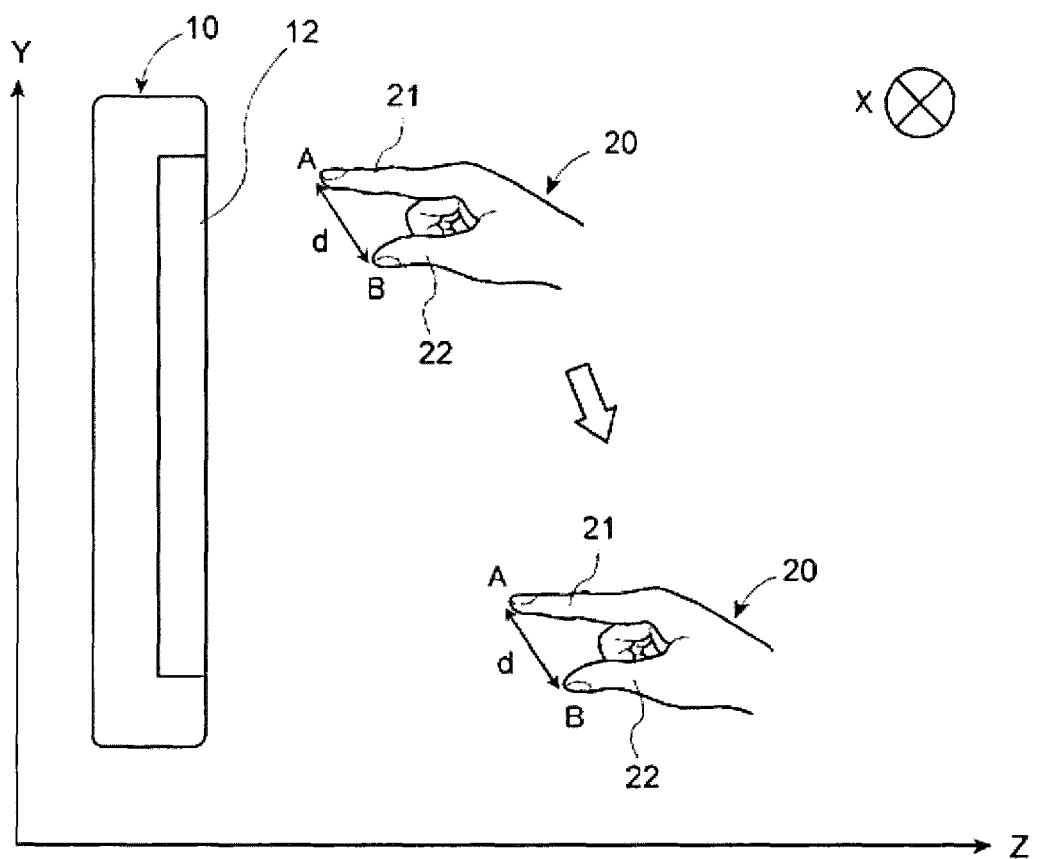
FIG. 4 illustrates a non-limiting example of a detection space of a 3D gesture in front of a display screen of a display apparatus, according to certain embodiments.

Next, FIG. 4 illustrates a non-limiting example of a detection space of a 3D gesture in front of a display screen of a display apparatus, according to certain embodiments.

Referring now to FIG. 4, in the detection space of the three-dimensional gesture in front of the display 12 of the display apparatus 10, when a user moves the hand 20 and fingers 21 and 22, the user is performing an instruction operation with respect to the display apparatus 10.

In the embodiment of FIG. 4, the position of each tip of the fingers 21 and 22 are detected by 3D gesture sensor 107 as features points A and B. In this embodiment, the distinction between a first instruction operation (e.g., a scroll operation) and a second instruction operation (e.g., a click operation) is determined based on time-series data related to three parameters: the coordinates of the first point A, the coordinates of the second point B, and the distance between points A and point B. For example, a user's gesture may be monitored by the 3D gesture sensor 107, and the coordinates of the first point A at the tip of the index finger 21 and the coordinates of the second point B at the tip of the thumb 22 may be acquired periodically. Simultaneously, the distance between the first point A and the second point B may be computed from the determined coordinates of both points.

In the example of FIG. 4, a user's hand 20 is moving in front of the display 12. The coordinates of the first point A, the coordinates of the second point B, and the distance between the first and second points A and B may be acquired at one or several time points during the start time and end time of a gesture. The distance between the first point A at the tip of an index finger 21 and the second point B at the tip of the thumb 22 may be represented by variable d.

Figure 5:
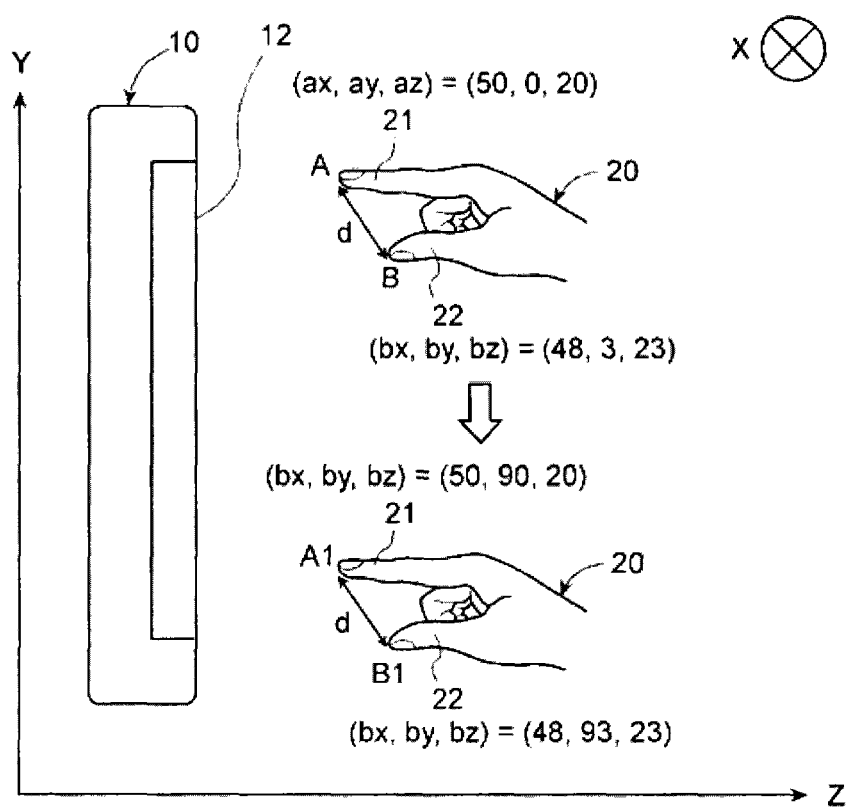
FIG. 5 illustrates a non-limiting example of performing a gesture corresponding to a scroll operation, according to certain embodiments.

Next, FIG. 5 illustrates a non-limiting example performing a gesture corresponding to a scroll operation, according to certain embodiments.

Referring now to FIG. 5, in this embodiment, while the user maintains the space (namely, distance d) between the first and second points A and B substantially constant, an action of moving the hand 20 substantially parallel with respect to the display 12 is performed. In this example, the controller 101 may determine, based on received inputs from the 3D gesture sensor 107, that when the x-coordinate and y-coordinate of the first point A change while the distance between the first and second points A and B is maintained substantially the same. That is, while the detected coordinates of points A and B in FIG. 5 change to the coordinates of points A1 and B1, the distance between points A and B is substantially the same as the distance between points A1 and B1.

Based on an analysis of the relative positions of the points A and B with respect to each other and with respect to the display, the controller 101 may determine that the user is performing a first instruction operation corresponding to a scroll operation. The determination that the user is performing the first instruction operation may be based on a comparison of the data related to points A and B with corresponding instruction operation data stored in the memory 106. In response to determining that the first input operation is a scroll operation, the controller 101 may control the display 12 such that the image currently displayed on the display screen moves in a direction corresponding to the detected motion of the tip of the index finger 21.

Figure 6:
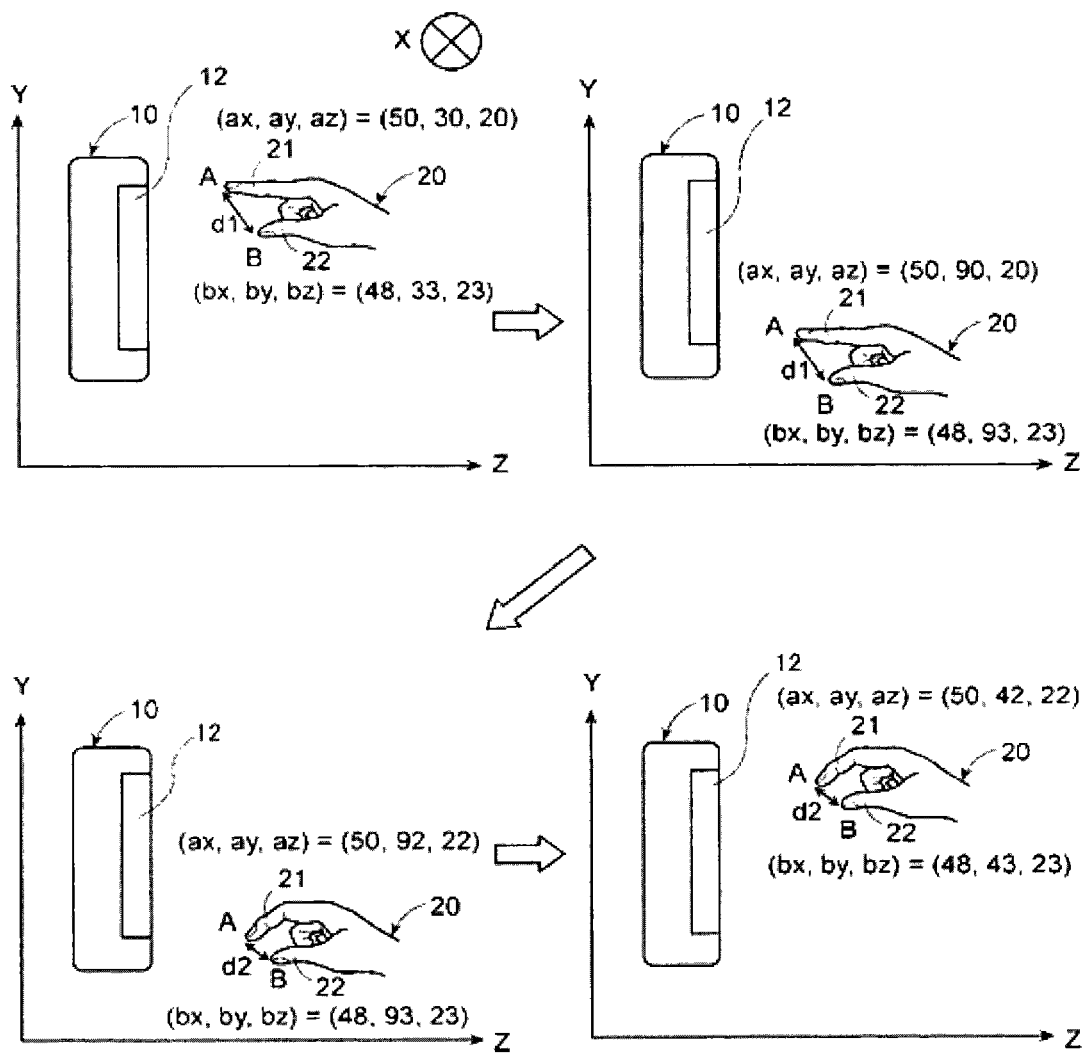
FIG. 6 illustrates a non-limiting example of a gesture related to scrolling continuously after scrolling past a detection range of a display or scrolling on substantially the whole region of a display screen, according to certain embodiments.

Next, FIG. 6 illustrates a non-limiting example of a gesture related to scrolling continuously after scrolling past the detection range of a display or scrolling on substantially the whole region of a display screen, according to certain embodiments.

Referring now to FIG. 6, the gesture corresponding to a scroll operation in certain embodiments is the state which maintains distance $d_1$ between the first and second points A and B while moving the first point A as mentioned above. However, after performing a gesture corresponding to the scroll operation, there may be a case in which in order to continue the scroll operation further past the maximum detection range of the sensor or the maximum movement range of the user, it is necessary to return the moving hand 20 to its original position (i.e., the position at the start of the gesture). Therefore, in order to prevent an unintended scrolling of the displayed imagery as the hand 20 moves back to the original position, the processing related to the scroll operation should be suppressed when returning the hand 20 to its original position. That is, in order to continue the scroll operation, the related processing may be interrupted and then re-started when the hand 20 returns to the original position.

As a non-limiting example of detecting a gesture corresponding to interrupting the scroll operation, FIG. 6 illustrates that when the hand 20 reaches the maximum range for performing the gesture, the distance between feature points A and B decreases from d1 to d2. In response to detecting the change in distance between feature points, the controller 101 may interrupt processing corresponding to the scroll operation, which allows the user to move his or her hand 20 back to the original position without causing an unintended upward scrolling operation to be detected. When the hand 20 returns to the original position (or substantially the same position), the scroll operation can be performed again.

In certain embodiments, a gesture indicating that the interrupted scroll operation should be restarted may be detected when the user moves the hand 20 to the new position. For example, the distance d2 may be increased as an indication that the scrolling processing should be restarted. However, such a gesture is not necessary, and the controller 101 may restart the processing without the detection of another gesture. Further, in certain embodiments, the controller 101 may resume processing related to detecting a scrolling operation when it is determined that one or more feature points is outside a predetermined range from a spatial point where the maximum detection range was initially exceeded.

Figure 7:
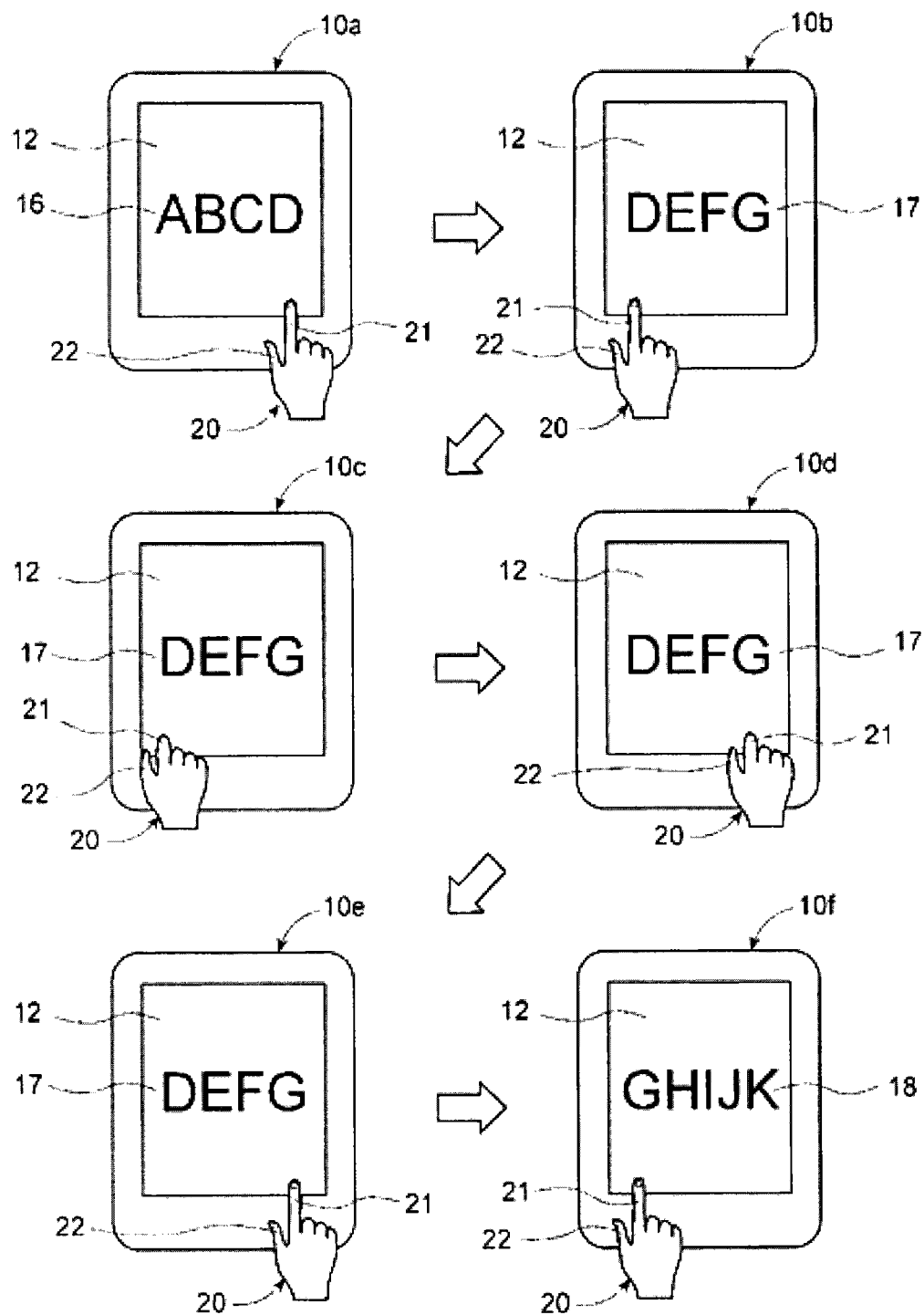
FIG. 7 illustrates a non-limiting example of a scroll operation on the display screen exceeding the detection range of a corresponding sensor, according to certain embodiments.

Next, FIG. 7 illustrates a non-limiting example of a scroll operation on a display screen exceeding the detection range of a corresponding sensor, according to certain embodiments.

Referring now to FIG. 7, the hand 20 in this example is located at the right end of the display 12, and processing related to a scroll operation is started in response to detecting a gesture corresponding to the scroll operation (see state 10a).

In this example, an image region 16 (text "ABCD") changes in response to detecting the hand 20 moving from the lower right side of the screen to the lower left (i.e., the scroll operation gesture in this example). Specifically, the controller 101 controls the display 12 such that the screen displays image region 17 (text "DEFG") in response to the detected movement (see state 10b). Furthermore, in order to continue the scroll operation in the same direction (i.e., right to left) without an undesired scrolling operation occurring in response to the hand 20 moving back to the right side of the display 12, processing related to the scroll operation may be interrupted by performing another gesture that is detectable with the 3D gesture sensor 107. As discussed above, the gesture for suspending the processing related to the scrolling operation may be bending the index finger 21 in order to decrease the distance "d" between the first and second feature points A and B (see state 10c). While maintaining the decreased distance d, the hand 20 is moved to the right end of the display 12 screen without a change in the displayed imagery (see state 10d). That is, since the gesture at this time does not instruct a scroll operation to be performed, the hand 20 may be moved in a manner that would otherwise result in a scroll operation without a corresponding change in the display 12 output.

Following the return of the hand 20 to the right side of the display 12 screen, the index finger 21 is extended (see state 10e) and the hand 20 is again moved to the left side of the display 12 in a similar manner as the scroll operation discussed above (see state 10f). In response to detecting the second gesture corresponding to the scroll operation, the image region 17 moves leftward such that a new image region 18 (text "GHIJK") is displayed.

The gesture, shown in the state 10c of FIG. 7, at the time when the distance between the first and second points A and B changes at the end of a movement of the hand 20 accompanying the first scroll operation, may be indistinguishable from a gesture corresponding to a drag operation discussed later with respect to certain embodiments. As a countermeasure against this problem, the action at the time of scroll discontinuation and dragging may be distinguished by interpreting it as a state of focusing on an icon as an object for which a drag action may be possible, as will be mentioned later. Additionally, separate gestures may be assigned to the drag and scroll operations.

Figure 8:
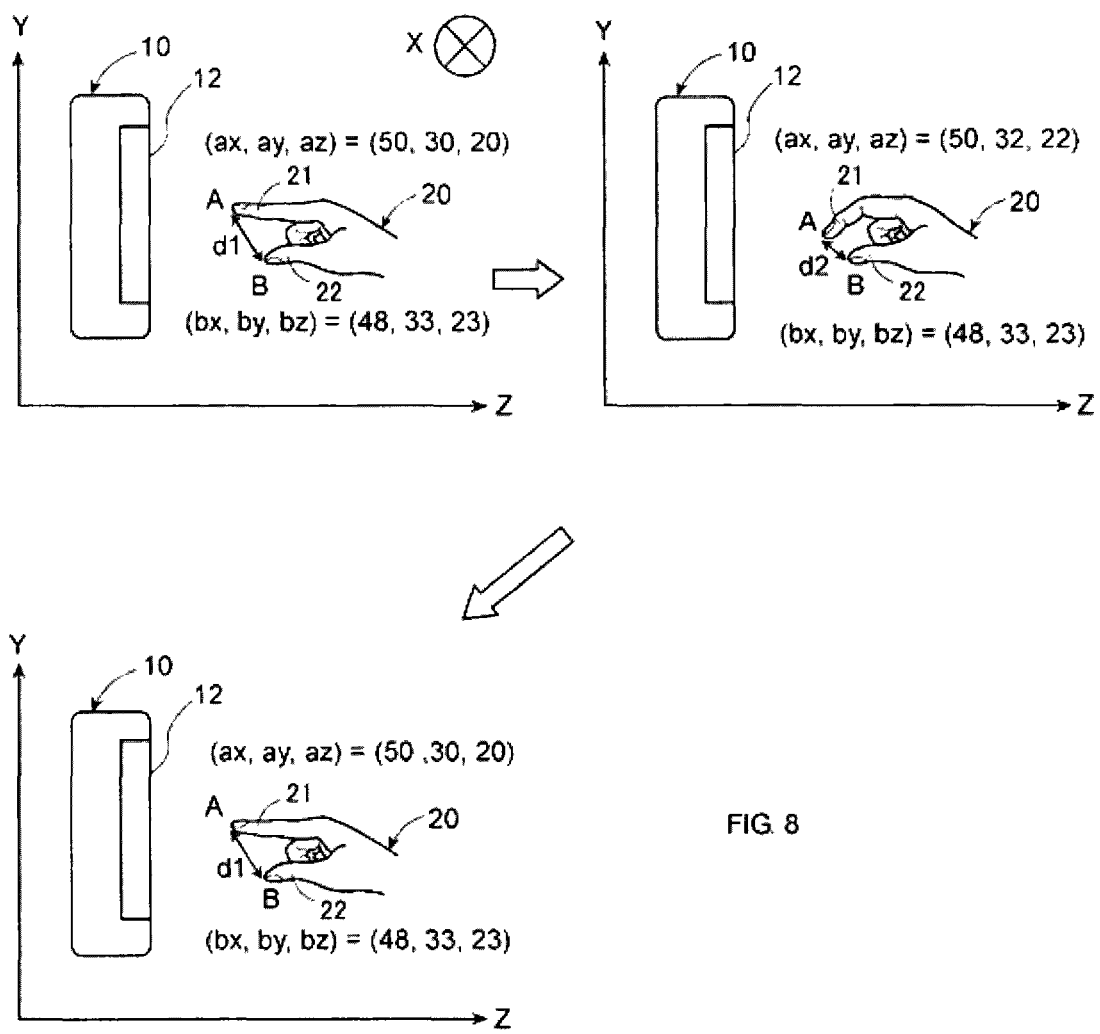
FIG. 8 illustrates a non-limiting example of performing a gesture corresponding to a click operation, according to certain embodiments.

Next, FIG. 8 illustrates a non-limiting example of performing a gesture corresponding to a click operation, according to certain embodiments.

Referring now to FIG. 8, in this example, a user keeps the thumb 22 unmoved, moves the index finger 21 toward the thumb 22, and then returns the index finger 21 to its original position or in other words, reciprocates movement of the index finger. In this case, coordinates of point B are kept unchanged (or negligibly changed) and a distance $d_1$ between the first and second points A and B of the index finger 21 and the thumb 22 is reduced to distance $d_2$, and then the distance increases to original distance $d_1$. In certain embodiments, the distance between points A and B may be increased to another distance that is larger or smaller than distance d1.

In the example of FIG. 8, coordinates of the second point B do not change while the first point A moves down on the y-axis for a specific amount and then reciprocates its move back up the y-axis. Accordingly, by detecting such a gesture, the 3D gesture sensor 107 judges that the user is performing a gesture corresponding to a second input operation. In this example, the second input operation is a click operation. As discussed above for the scroll operation processing, a comparison of data from the 3D gesture sensor 107 with stored data in the memory 106 may be performed in order to determine that the gesture corresponding to the click operation was performed.

In addition, it is understood that for a click operation the first point A naturally moves on the y-axis. However, the direction toward which the first point A moves may also be on x-axis or z-axis, or a combination of directions.

In general, for detecting a click operation in certain embodiments, the controller 101 detects an operation in which the first point A approaches the second point B and then reciprocally moves away with a specific up and down movement amount, rather than detecting a movement away from point B with a specific amplitude, direction, speed, final position, etc. However, in certain embodiments, the controller 101 may detect that the click operation occurs when the first point A returns to its original position after approaching the second point B.

Figure 9:
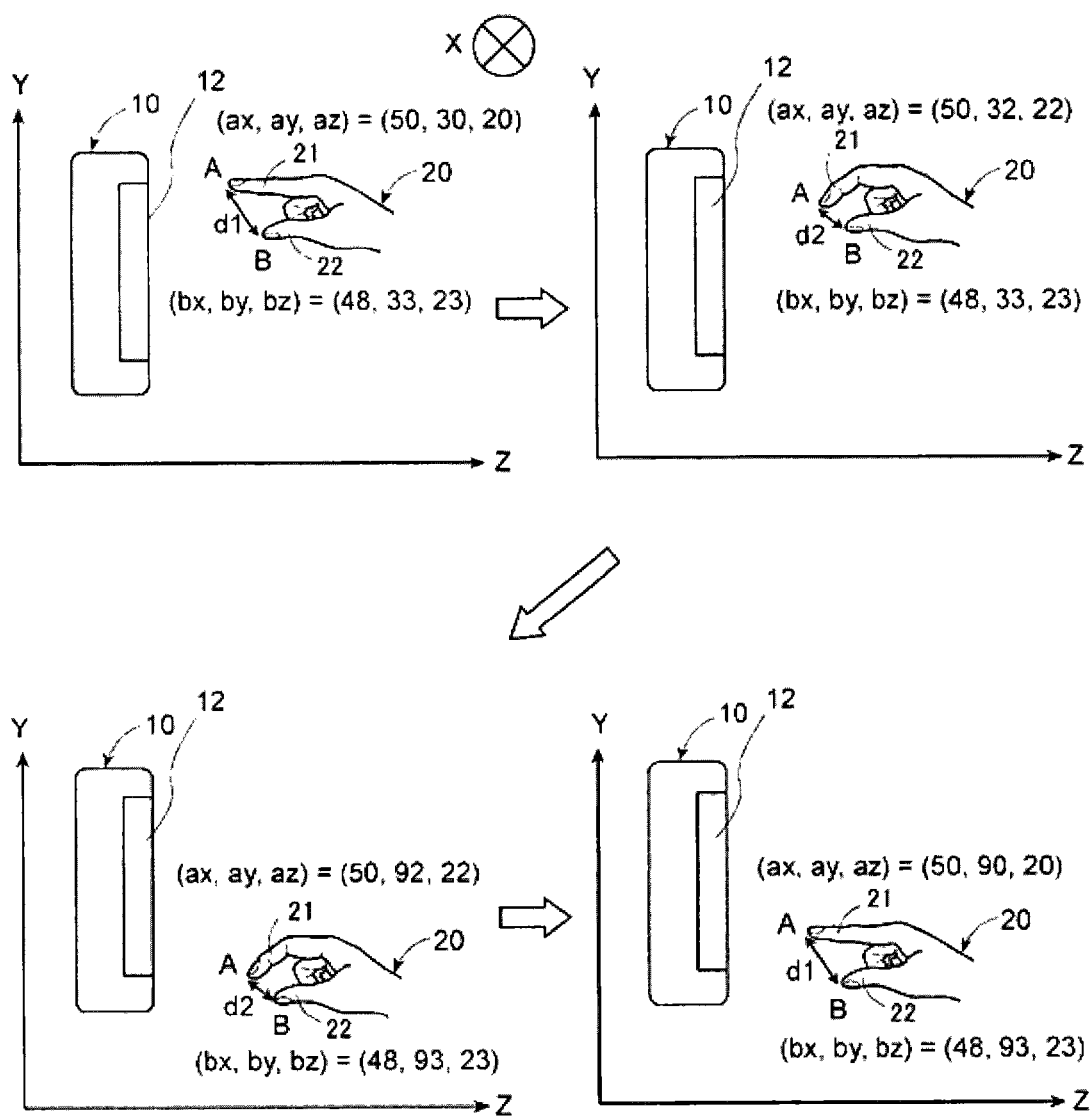
FIG. 9 illustrates a non-limiting example of performing a gesture corresponding to a drag operation, according to certain embodiments.

Next, FIG. 9 illustrates a non-limiting example of performing a gesture corresponding to a drag operation, according to certain embodiments.

Referring now to FIG. 9, for the purposes of the present disclosure, a drag operation is an operation in which the user selects an arbitrary object, such as a displayed icon in a certain position on a screen, and moves the object to another position on the screen. In certain embodiments, the user may "select" the object to be dragged by performing a pinching gesture and subsequently moving the hand to a different location. In certain embodiments, the icon may be "dropped" in a new location after being dragged, which is referred to as a "drag and drop" operation.

In a non-limiting exemplary embodiment, the controller 101 determines that a gesture corresponding to a drag operation is performed by receiving inputs from the 3D gesture sensor 107 indicating that the user pinches a target object (i.e., the user performs a pinching motion with his or her fingers in a coordinate position corresponding to the displayed target object).

Referring to the illustration in FIG. 9, a drag operation in this example corresponds to a gesture in which the index finger 21 first approaches the thumb 22. At this time, the distance between the first and second points A and B changes from $d_1$ to $d_2$. Although the first half of the drag operation so far is similar to the operation of reciprocation of point A in the above-described click operation, the operations of the second half differ. Following the gesture of pinching the target object, the user moves the hand 20 in a desired direction substantially parallel to the screen in a manner that distance $d_2$ between points A and B is maintained substantially the same. At this time, the change of either point A's x-coordinate or point B's y-coordinate can be utilized to determine the target object movement during the drag operation. At the final step of the drag operation, the user returns the index finger 21 to an original position relative to the thumb 22 (i.e., the user extends the distance between points A and B, or the index finger 21 and the thumb 22, respectively, and returns the distance back to original distance $d_1$) and therefore, the drag operation is completed and the display 12 is updated accordingly.

In the above-described exemplary embodiment, when such a series of gestures are detected, 3D gesture sensor 107 determines that a gesture corresponding to a drag operation is performed by comparing the 3D gesture sensor 107 data detected during the gesture with correspondence data stored in the memory 106. In certain embodiments, the controller 101 ignores detected movements of the feature points (e.g., points A and B corresponding to the user's fingertips) and/or the movement of the user's hand unless the detected motion is above a predetermined threshold (e.g., motion above a predetermined distance, speed, etc.). Thus, misdetection of whether a target object should be moved can be prevented by accounting for hysteresis and incorporating a "dead zone" motion buffer to ignore slight unintended motion.

Figure 10:
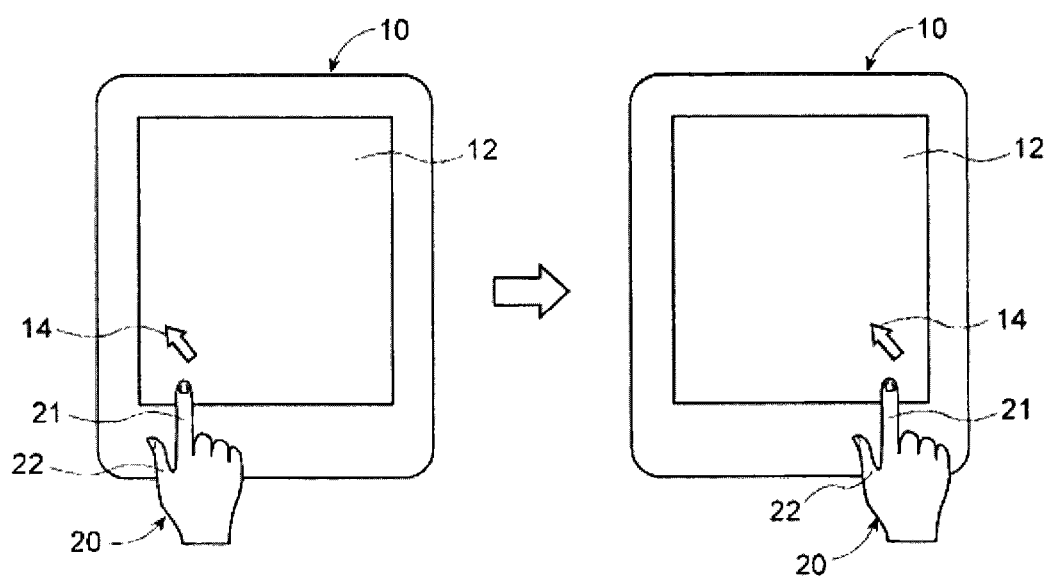
FIG. 10 illustrates a non-limiting example of an application, or operating state, in which a cursor is displayed on a display screen, whereby the user performs a gesture corresponding to moving the cursor, according to certain embodiments.

Next, FIG. 10 illustrates a non-limiting example of an application, or operating state, in which a cursor is displayed on a display screen, whereby the user performs a gesture corresponding to moving the cursor, according to certain embodiments.

In the exemplary operating state of the display apparatus 10 shown in FIG. 10, it is assumed that scrolling functionality is unnecessary or improper with respect to the interface displayed on the display 12. In such a case, similar to the exemplary gesture discussed above for a scroll operation, a cursor 14 may be tracked and moved based on detected changes in the position of the index finger 21 x/y coordinates. That is, processing for controlling the display 12 to move the cursor 14 may be similar to the aforementioned processing related to the scroll operation. However, the controller 101 may additionally determine a current operating state in order to determine the manner of control applicable to the display 12 when the gesture is detected. Accordingly, although the motion of two gestures is similar, the same gesture may correspond to different input operations, with the distinction being the current operating state of the device. In certain embodiments, a current operating state may include a currently active application or set of applications, a display orientation, a selected input source for display, or the like.

Thus, in accordance with features of the above-described exemplary embodiment of FIG. 10, the same gesture can be allocated to different operations (e.g., scroll operation and cursor movement operation may have the same corresponding gesture) according to the current operating state of the display apparatus 10. For example, in addition to correlating 3D gesture sensor 107 data with predetermined data stored in the memory 106, the controller 101 may also, in certain embodiments, determine an operation to be performed based on a combination of gesture features and the application currently running on the device. Such correspondence data may be stored, e.g., in a lookup table in the memory 106.

In certain embodiments, the method of pausing processing related to a gesture when exceeding the detection range of the gesture, such as the method demonstrated in FIG. 7, is also similarly applicable to processing related to moving a cursor position.

Figure 11:
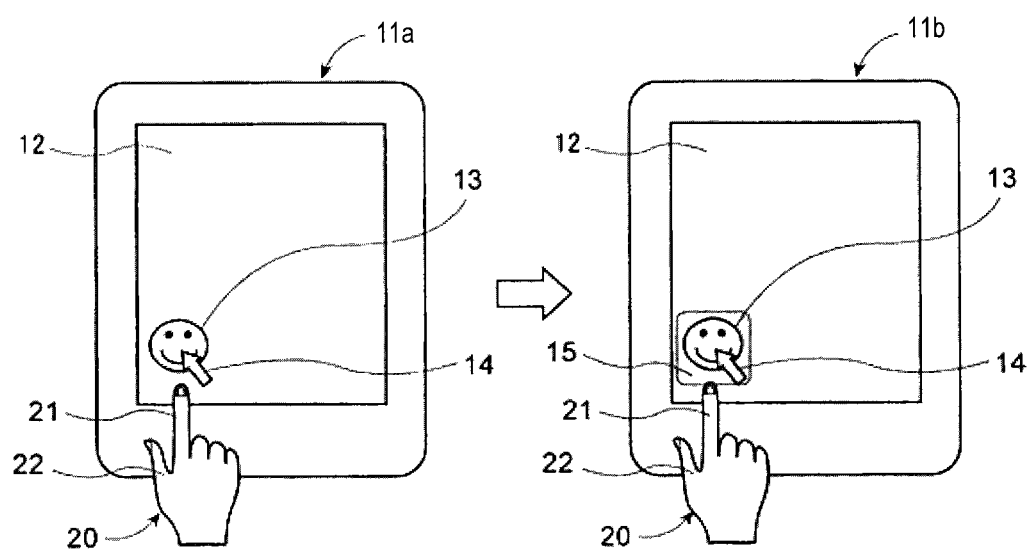
FIG. 11 illustrates a non-limiting example of a change of a display attribute of an object when the object is selected for a drag operation, according to certain embodiments.

Next, FIG. 11 illustrates a non-limiting example of a change of a display attribute of an object when a user designates arbitrary objects, such as an icon used as the object of a drag operation on a display screen, using a cursor, according to certain embodiments.

Referring now to FIG. 11, cursor 14 is illustrated in state 11a as overlapping an arbitrary icon 13 on the display 12. The controller 101 may detect when the overlapping condition continues for more than a predetermined time (e.g., 0.5 seconds). As a result of detecting the cursor overlap in excess of the time threshold, the controller 101 controls the display 12 such that the display 12 changes the state of the icon 13 to a state where a drag operation is possible (see state 11b in FIG. 11). Display part 15 in state 11b of FIG. 11 illustrates a display effect which emphasizes that icon 13 was overlapped by the cursor 14 for more than a predetermined time duration and is now in a state in which the icon 13 may be dragged. Thus, it becomes easy for a user to recognize that the object is actually in the selected state, thereby making the drag action possible.

Figure 12:
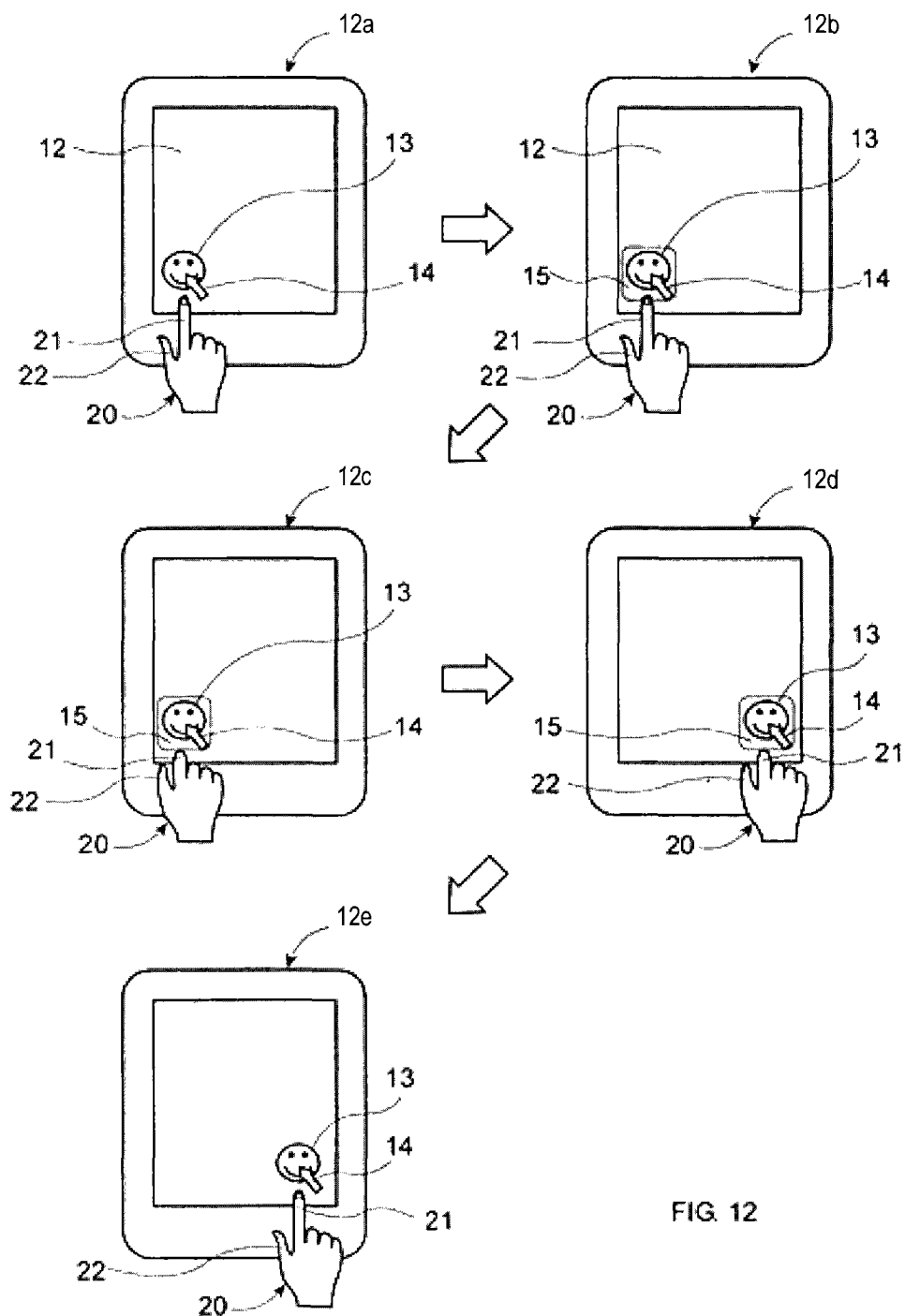
FIG. 12 illustrates a non-limiting example of changes of states of a display screen at the time of an operation for dragging an object to another position from a certain position on a screen, according to certain embodiments.

Next, FIG. 12 illustrates a non-limiting example of changes of states of a display screen at the time of an operation for dragging an object to another position from a certain position on a screen, according to certain embodiments.

Referring now to FIG. 12, state 12a illustrates a state in which cursor 14 overlaps with arbitrary icon 13 on the display 12. State 12b shows that icon 13 is selected or highlighted so that a drag operation of the icon 13 is possible. State 12c of FIG. 12 shows a state in which the icon 13 in which the icon 13 is selected for a dragging operation in response to detecting a pinching gesture with the index finger 21 and the thumb 22. State 12d of FIG. 12 illustrates a state in which the icon 13 was dragged to a position at the lower left of the display 12. State 12e of FIG. 12 shows highlighting cancellation or the state at which the selection of icon 13 (e.g., by pinching) was canceled. In this example, when the dragging of the icon 13 is finished, the highlighting of the dragged object is also canceled.

In certain embodiments, after overlapping of the cursor 14 with the icon 13 is cancelled for a predetermined time, the icon 13 may be highlighted again. However, in certain embodiments, when the dragging operation is completed, as long as the state at which the cursor 14 still overlaps with the icon 13 is continuing, the highlighting of the icon 13 may be maintained.

Figure 13:
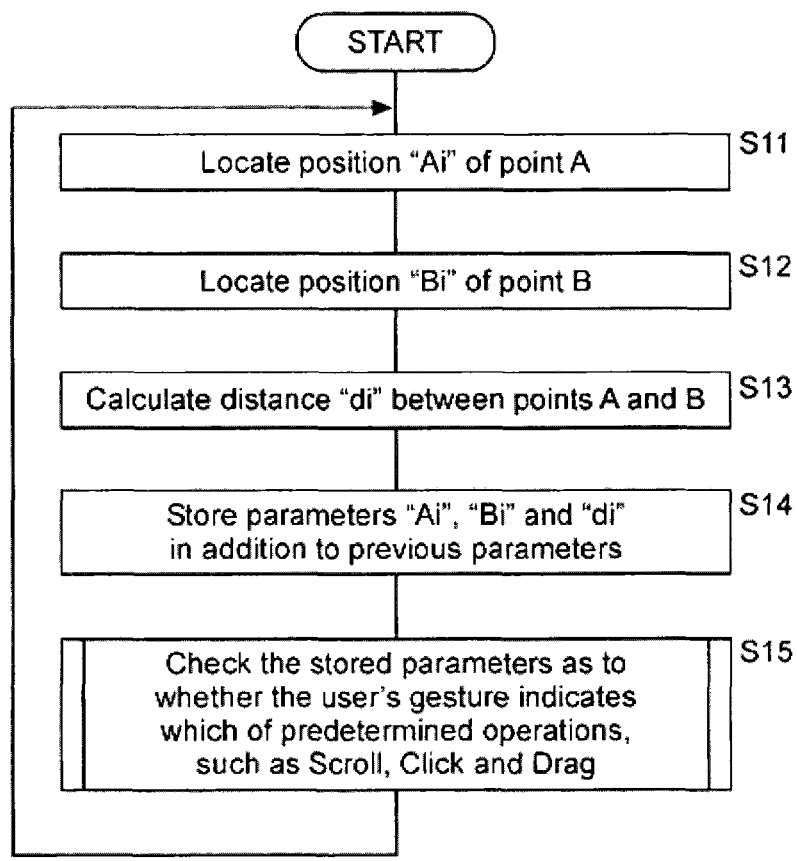
FIG. 13 illustrates a non-limiting example of a flowchart showing the sequence of a gesture detection process, according to certain embodiments.

Next, FIG. 13 illustrates a non-limiting example of a flowchart showing the schematic sequence of a gesture detection process, according to certain embodiments.

Referring now to FIG. 13, in certain embodiments, the controller 101 may continuously perform this process in a period during which a user's gesture corresponding to an instruction operation is received.

In step S11, the controller 101 determines the present position of feature point A, which is a first feature point being pinpointed and denoted by three-dimensional coordinate $A_i=(a_{ix}, a_{iy}, a_{iz})$ for I=0, 1, 2, 3, . . . . Coordinate data corresponding to feature point A is stored as sequential position data Ai. For simplicity, feature point A in this example corresponds to the fingertip on a user's index finger. However, the present disclosure may be adapted such that other points on the user's body and/or points on other objects are detected as feature points.

In step S12, the controller 101 determines the present position of feature point B, which is a second feature point being pinpointed and denoted by three-dimensional coordinate $B_i=(b_{ix}, b_{iy}, b_{iz})$ for I=0, 1, 2, 3, . . . . Coordinate data corresponding to feature point B is stored as sequential position data Bi. For simplicity, feature point B in this example corresponds to the tip of the user's thumb on the same hand as the index finger corresponding to feature point A. However, the present disclosure may be adapted such that other points on the user's body and/or points on other objects are detected as feature points.

In certain embodiments, the sequential position data Ai and Bi is determined for a time period corresponding to a detected gesture. For example, the controller 101 may determine, based on received inputs from the 3D gesture sensor 107, the beginning and end of a detected motion corresponding to a gesture. The controller 101 may then associate the sequential position data with the gesture that resulted in the generation of the sequential position data, and the sequential position data for the time period corresponding the gesture may be stored in the memory 106.

In step S13, the controller 101 calculates distance $d_i$ between points A and B. In certain embodiments, the distance di may be calculated for each corresponding coordinate data set in sequential position data Ai and Bi. In other implementations, the distance di may be calculated only for selected coordinate points, such as the first and last coordinates in the sequential position data Ai and Bi. The distance $d_i$ may be represented by following formula:

$$d_i = \sqrt{(b_{ix} - a_{ix})^2 + (b_{iy} - a_{iy})^2 + (b_{iz} - a_{iz})^2}$$

In step S14, the parameters $A_i$, $B_i$, and $d_i$, for i=1, 2, 3, . . . , are stored in the memory 106 as sequential position data.

In step S15, the controller 101 determines, based on the sequential position data stored in the memory 106, whether the received data corresponding to the user's gesture corresponds to one of a plurality of predetermined input operations. For example, in certain embodiments, the controller 101 may determine, based on the sequential position data stored in the memory 106, whether a gesture corresponding to a scroll, click, or drag input operation is performed. In certain embodiments, the controller 101 compares one or more of a motion track corresponding to a change from the initial points A and B to the final points A and B, and a change in distance between points A and B during the motion, to stored motion tracks and/or changes in distance corresponding to predetermined input operations in order to determine whether the conditions for any one of the plurality of predetermined input operations were satisfied by the detected gesture. Based on the comparison result, the controller 101 may perform processing corresponding to the detected input operation.

In certain embodiments, the controller 101 may additionally classify the detected gesture in step S15. A gesture classification may relate to the general motion performed during the gesture. For example, two hand gestures may be performed using a similar motion, by may differ in the relative position at which the motion was performed with respect to the display screen. In this case, the two gestures would share a common gesture classification, but the sequential position data corresponding to the gestures would differ.

In certain embodiments, the formula for calculating distance $d_i$ in step S13 may exclude the distance component of the z-axial direction, and the distance between feature points may be represented with the following formula:

$$d'_i = \sqrt{(b_{ix} - a_{ix})^2 + (b_{iy} - a_{iy})^2}$$

This distance $d'_i$ is equivalent to the distance acquired by projecting the distance $d_i$ between points A and B in three-dimensional space on a plane parallel to a display screen. In the case where distance $d'_i$ is calculated in lieu of distance $d_i$, the processing in steps S11 through S15 may still periodically performed in a similar manner as discussed above.

Further, although the processing of step S15 was shown following the processing of steps S11 through S14 in the example of FIG. 13, in certain embodiments, the processing of steps S11 through S14, and another process such as step S15, may be performed in parallel.

Figure 14:
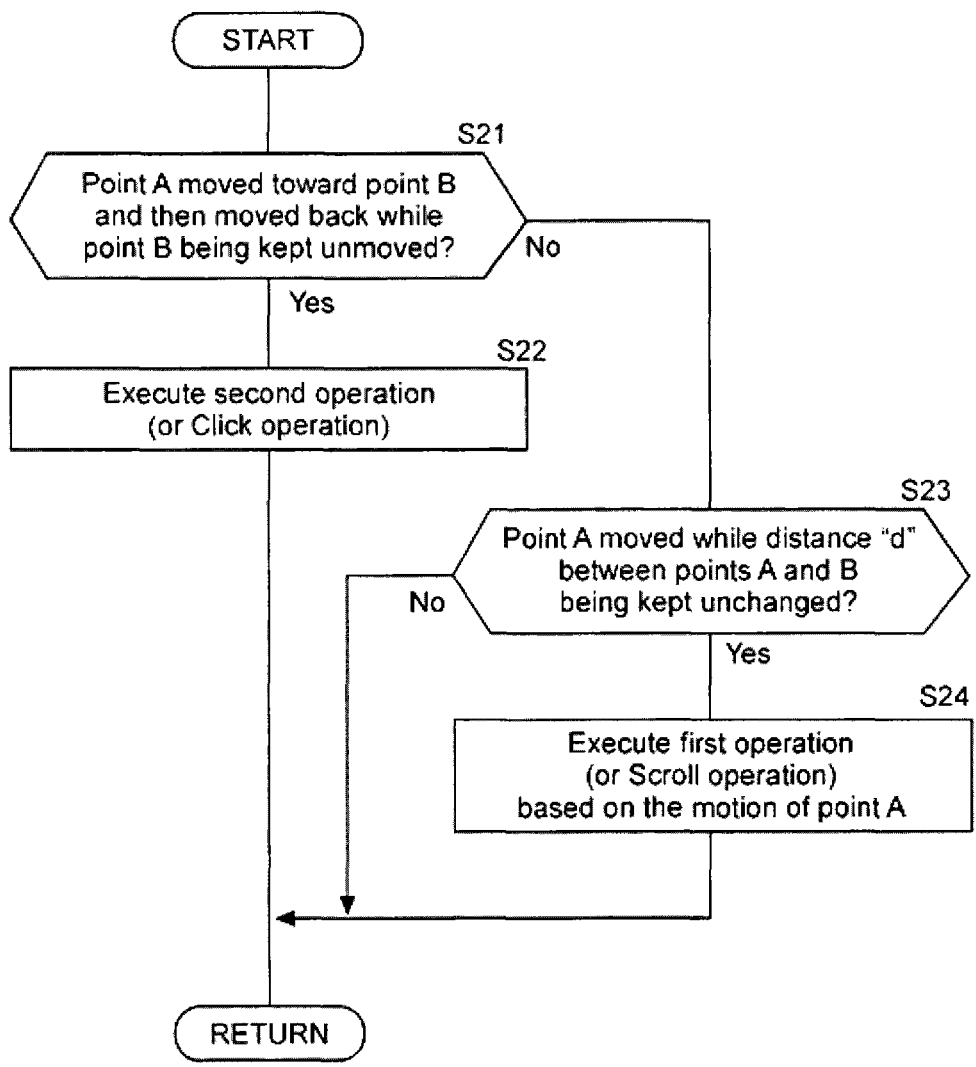
FIG. 14 illustrates a non-limiting example of a flowchart showing a process for determining to which of a plurality of predetermined operations a detected gesture corresponds, according to certain embodiments.

Next, FIG. 14 illustrates a non-limiting example of a flowchart showing a process for determining to which of a plurality of predetermined operations a detected gesture corresponds, according to certain embodiments. In certain embodiments, the processing illustrated in FIG. 14 may correspond to step S15 in FIG. 13.

For the purposes of FIG. 14, it is assumed that this exemplary process may be performed based on the coordinates of most recently acquired points $A_i$, $B_i$ and most recently calculated distance $d_i$, and may also include one or more of the previously determined values for points $A_i$, $B_i$ and distance $d_i$ stored in the memory 106 (e.g., from data determined, received, and/or calculated in previous processing steps).

In step S21, the controller 101 determines, for a detected gesture, whether point A moved toward point B and then returned to its original position while the position of point B remained substantially unchanged during the detected gesture.

If the result of step S21 is "yes," the controller 101 at step S22 determines that the detected gesture corresponds to a click operation, and the controller 101 carries out processing related to the click operation.

Otherwise, if the result of step S21 is "no," the controller 101 at step S23 determines, for the detected gesture, whether the position of point A moved while distance d between points A and B remained unchanged.

If the result of step S23 is "yes," the controller 101 at step S24 determines that the detected gesture corresponds to a scroll operation, and the controller 101 carries out processing related to the scroll operation.

Otherwise, if the result of step S23 is "no," the process returns to the start and the controller 101 continues monitoring for detected gestures.

Figure 15:
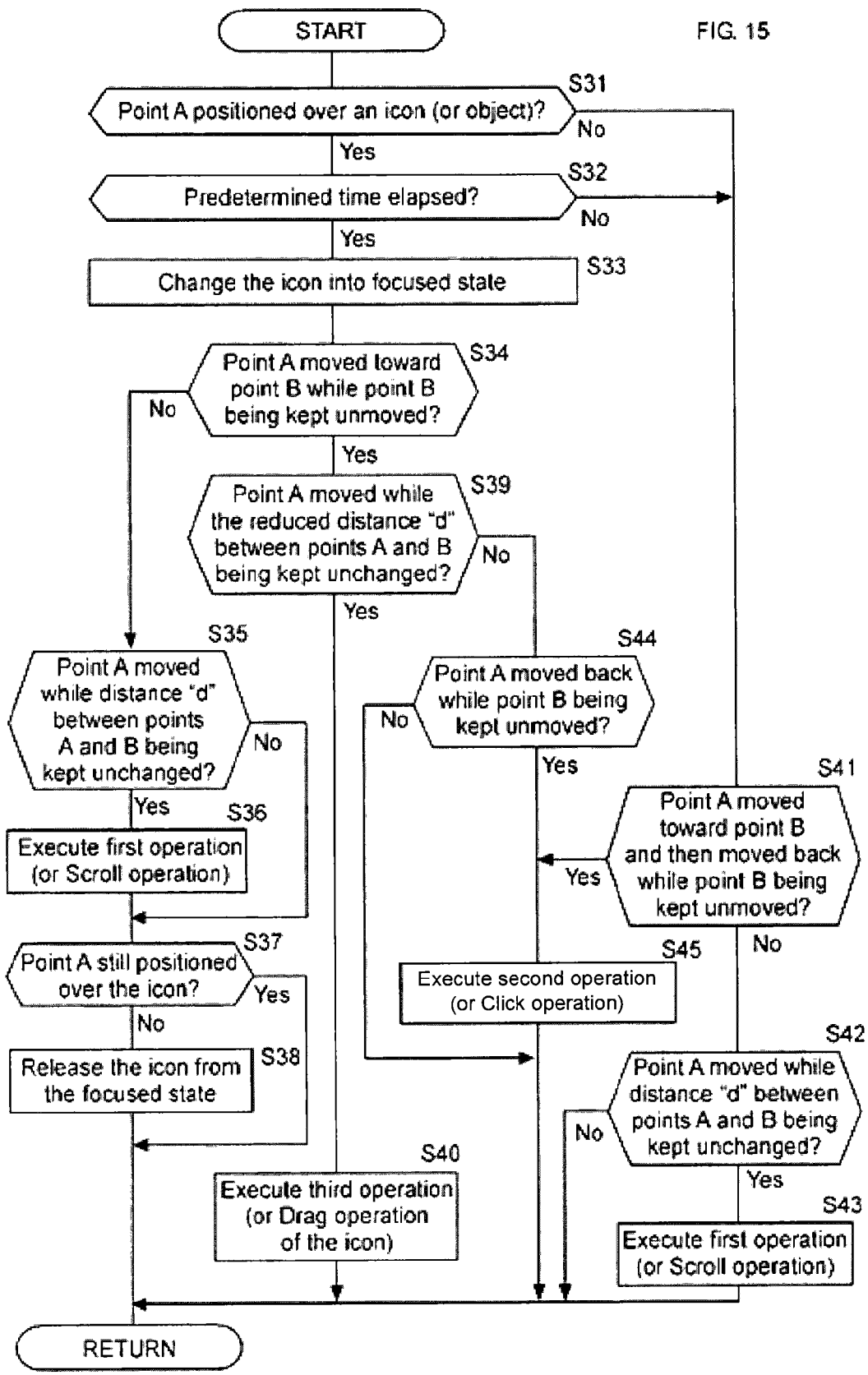
FIG. 15 illustrates a non-limiting example of a flowchart showing another example of a process for determining to which of a plurality of predetermined operations a detected gesture corresponds, according to certain embodiments.

Next, FIG. 15 illustrates another non-limiting example of a flowchart showing a process for determining to which of a plurality of predetermined operations a detected gesture corresponds, according to certain embodiments. In certain embodiments, the processing illustrated in FIG. 15 may correspond to step S15 in FIG. 13.

As was the case for FIG. 14, it is assumed that the exemplary process of FIG. 15 may be performed based on the position or coordinates of most recently acquired points $A_i$, $B_i$ and most recently calculated distance $d_i$, and may also include one or more of the previously determined values for points $A_i$, $B_i$ and distance $d_i$ stored in the memory 106 (e.g., from data determined, received, and/or calculated in previous processing steps).

Referring now to FIG. 15, the controller 101 at step S31 determines whether point A and/or cursor 14 is positioned over an icon or another arbitrary display element/object (for simplicity, the remainder of this example is explained with respect to an icon).

If the result of step S31 is "yes," the controller 101 at step S32 determines whether point A and/or the cursor 14 is positioned over the icon for greater than a predetermined time threshold.

If the result of step S32 is "yes," the controller 101 at step S33 controls the display 12 such that the icon is changed into a focused state. For example, to signify the icon being in the focused state, the controller 101 may control the display 12 such that the icon is highlighted or otherwise distinguished from other displayed icons in some manner.

At step S34, the controller 101 determines, for the detected gesture, whether point A moved toward point B while the position of point B remained unchanged.

If the determination result of step S34 is "no," the controller 101 at step S35 determines, for the detected gesture, whether point A moved while distance d between points A and B remained unchanged.

If the determination result of step S35 is "yes," the controller 101 at step S36 determines that the detected gesture corresponds to a scroll operation, and the controller 101 performs processing related to the scroll operation.

At step S37, the controller 101 determines whether point A remains positioned over the icon or is overlapping with it. If the result of step S37 is "no," the controller 101 at step S38 releases the icon from the focused state. For example, in step S38, the controller 101 may control the display 12 such that the icon is no longer highlighted or otherwise indicated as being in the focused state, and processing related to an icon being in a focused state may be suspended.

Returning to the determination at step S34, if the determination result of step S34 is "yes," the controller 101 at step S39 determines whether point A moved while the reduced distance d between points A and B remained unchanged.

If the determination result of step S39 is "yes," the controller 101 determines at step S40 that the detected gesture corresponds to a drag operation, and the controller 101 performs processing related to the drag operation. For example, the controller 101 may control the display 12 such that the icon is dragged to a different position on the display screen.

Returning to the determinations at steps S31 and S32, if the determination result of steps S31 or S32 is "no," the controller 101 at step S41 determines, for the detected gesture, whether point A moved toward point B and then moved back to its original position while the position of point B remained substantially unchanged.

If the determination result of step S41 is "no," the controller 101 determines at step S42 whether point A moved while distance d between points A and B remained unchanged.

If the determination result of step S41 is "yes," the controller 101 at step S43 determines that the detected gesture corresponds to a scroll operation, and the controller 101 performs processing related to the scroll operation. For example, the controller 101 may control the display 12 such that a display area is scrolled in response to determining that the gesture corresponding to the scroll operation was performed.

Returning to the determination performed at step S39, if the determination result of step S39 is "no," the controller 101 at step S44 determines whether point A returned to its substantially original position while the position of point B remained substantially unchanged.

If the determination result of step S44 is "yes," or if the result of step S41 is "yes," the controller 101 at step S45 determines that the detected gesture corresponds to a click operation, and the controller 101 performs processing related to the click operation. For example, the controller 101 may start an application corresponding to the icon in response to determining that the detected gesture corresponds to the click operation.

As illustrated in the above example, by monitoring a motion of a user's finger by 3D gesture sensor 107, the controller 101 may determine, based on the received inputs corresponding to feature points detected by the 3D gesture sensor 107, to which of a plurality of predetermined input operations a detected gesture corresponds. Further, while not discussed in the context of the preceding example, the determination as to which of the plurality of predetermined input operations the detected gesture corresponds may include an analysis of the current operating state of the display apparatus 10. For example, as mentioned previously, multiple predetermined input operations may correspond to the same gesture, and the controller 101 may determine which of the multiple input operations should be executed based at least in part on the current operating state of the display apparatus.

Figure 16:
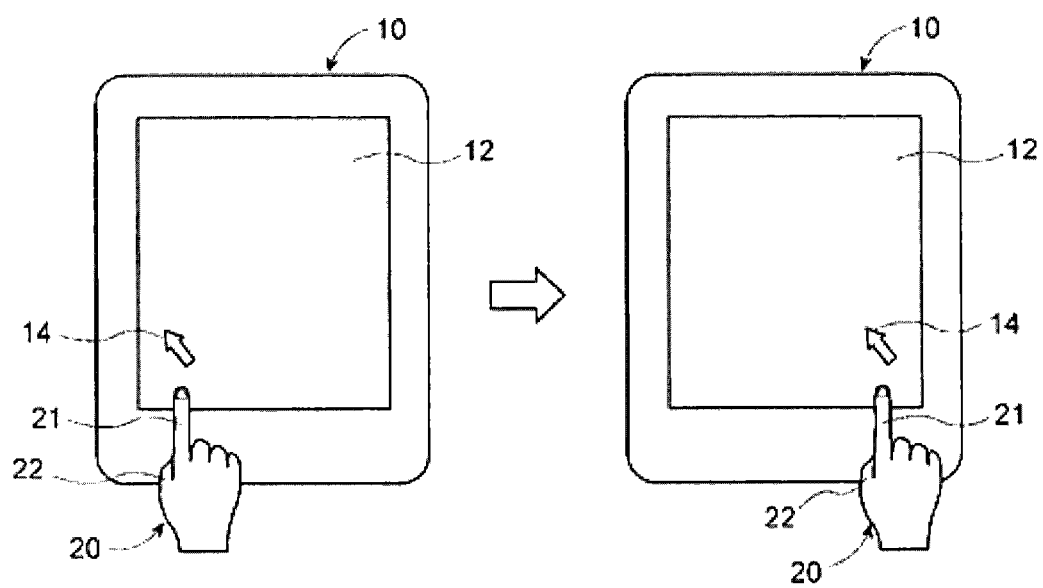
FIG. 16 illustrates a non-limiting example of a gesture specified by a user, the gesture being different from a first predetermined operation, the action being operated on arbitrary objects, such as an icon, which become subject to dragging, according to certain embodiments.

Next, FIG. 16 illustrates a non-limiting example of a gesture specified by a user, the gesture being different from a first predetermined operation, the action being operated on arbitrary objects, such as an icon, which become subject to dragging, according to certain embodiments.

Here, it is assumed to be the case that two input operations (e.g., a scroll operation and a cursor movement operation) are needed by the same application or the same operating state. In this case, in order to distinguish which input operation to perform based on a detected gesture, a different gesture should be allocated for the respective input operations.

Assuming the two input operations correspond to the scroll operation and the cursor movement operation, the cursor 14 may be tracked and moved based on a detected change in the position (x/y coordinate) of the index finger 21. In particular, the cursor 14 position may be controlled based on detected changes in feature point A when the feature point A corresponds to the tip of the index finger 21.

In order to distinguish the gesture of the cursor movement operation from the gesture of scroll operation, features of the hand 20 may be utilized. For example, as shown in FIG. 16, the state of bending the thumb 22 and extending only the index finger 21 may be considered as a gesture which corresponds to the cursor movement operation. Such a gesture can be recognized based on the coordinate values of some feature point acquired by 3D gesture sensor 107 (e.g., feature point A corresponding to the tip of index finger 21 and feature point B corresponding to the tip of the thumb 22, whereby the distance d between feature points may indicate that a gesture similar to the gesture of FIG. 16 is performed). However, the input instruction for cursor movement is not limited to a correspondence with a gesture similar to the gesture in FIG. 16, and other gestures for distinguishing between input operations may be applied in accordance with the present disclosure.

Figure 17:
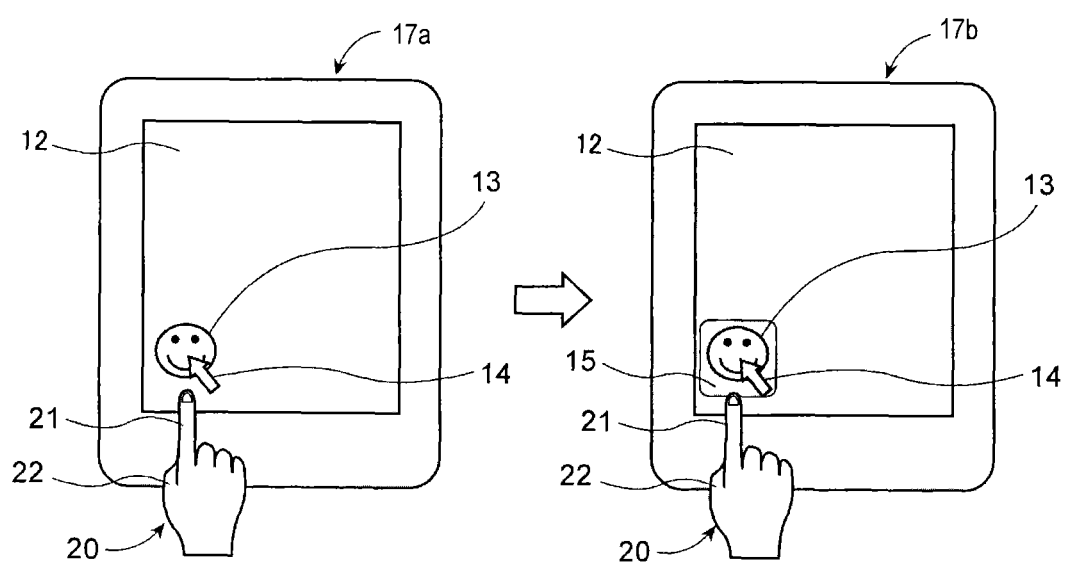
FIG. 17 illustrates a non-limiting example of a change of a display attribute of an arbitrary object selected for a drag operation, according to certain embodiments.

Next, FIG. 17 illustrates a non-limiting example of a change of a display attribute of an arbitrary object, such as an icon, based on the detected gesture of FIG. 16 when the object is dragged, as specified by a cursor, according to certain embodiments.

Referring now to FIG. 17, in a similar way as was demonstrated in FIG. 11, in an operating state 17a in which the cursor 14 overlaps with an arbitrary icon 13 on the display 12 screen for more than a predetermined time (e.g., 0.5 seconds), the controller 101 controls the display 12 such that icon 13 transitions to the focused state, as shown in operating state 17b. While in the focused state, the icon 13 may be selected for a drag operation. Display area 15 illustrates an exemplary manner in which the icon 13 may be indicated to be in the focused state. An indication such as the display area 15 makes it easy for a user to recognize that the object exists in a state in which a drag operation is possible.

Figure 18:
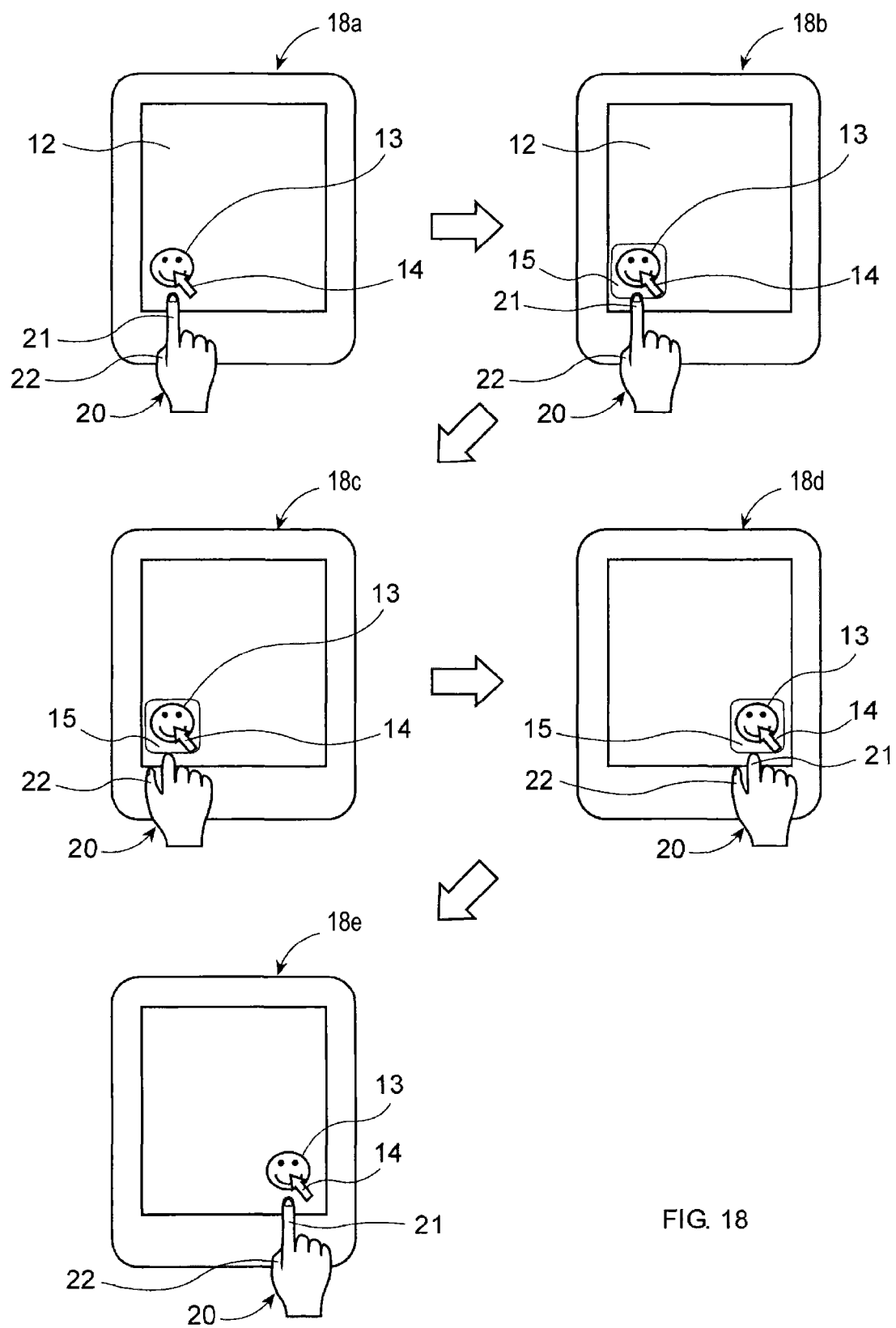
FIG. 18 illustrates a non-limiting example of changes of states of a display screen at the time of dragging an object to another position from a certain position on a screen combining the gesture of FIG. 16 and the gesture of the said dragging, according to certain embodiments.

Next, FIG. 18 illustrates a non-limiting example of changes of states of a display screen at the time of dragging an object to another position from a certain position on a screen, combining the gesture of FIG. 16 and the gesture of said dragging, according to certain embodiments.

Referring now to FIG. 18, state 18a shows the state of cursor 14 overlapping with arbitrary icons 13 on the display 12 screen using the gesture of the cursor movement operation in FIG. 16. State 18b shows the state of highlighting or selecting the icon 13 so that dragging the icon 13 is possible (i.e., the focused state). State 18c of FIG. 18 shows the state in which the index finger 21 and the thumb 22 perform a pinching gesture with respect to the icon 13. State 18d in FIG. 18 illustrates the icon 13 being dragged from left to right on the display 12 screen while the hand 20 is in substantially the same state as in state 18c. State 18e of FIG. 18 illustrates releasing the icon 13 from the focused/selected state in response to extending the index finger 21 so that the hand 20 is no longer performing the pinching gesture. In this example, when dragging of the icon 13 is complete, the highlighting of the icon 13 is canceled and the icon 13 is no longer in the state in which the icon may be dragged. After the cancellation is carried out, if cursor 14 overlaps with icon 13 for a predetermined time duration again, the focused/selected state of the icon 13 is activated again and the icon 13 is again highlighted on the display 12. The highlighted state of the icon 13 continues as long as cursor 14 remains overlapped with the icon 13.

As illustrated in the above example, and in particular in the differences between FIGS. 16 and 18, different gestures may be associated with different predetermined input operations, and a determination may be made as to which of the predetermined input operations should be performed based on an analysis of detected gestures. In certain embodiments, rather than assigning different correspondences to the same gesture in advance, when two of a plurality of predetermined input operations correspond to the same gesture and both of the predetermined input operations are available for execution in a currently active application, the controller 101 may assign a new gesture correspondence to one of the two predetermined input operations. Gesture correspondences may revert to their original state when the application is no longer active. Further, the re-assigned correspondences may be stored in the memory 106, and an output may be displayed on the display 12 to alert a user of the change. Moreover, a settings interface may be applied in certain implementations to make manual changes to gesture correspondences with input operations.

In addition to exemplary embodiments of this disclosure described above, it is possible to make various modifications and changes to the processing described herein. It is understood that various modifications, combinations, and other embodiments consistent with the present disclosure may naturally arise for those skilled in the art.

For example, the hand of the user who performs gesture is not required to be a right hand, but rather it can be a left hand.

Further, when a hand exists in the detection range for a gesture, a specific hand (e.g., a hand nearest to a screen) may be a detection target. Additionally, detected feature points do not necessarily need to be on the same object.

Further, in FIG. 11, an example of dragging the icon 13 by a pinching motion or gesture was demonstrated. In this example, when the hand performs the pinching gesture in a position corresponding to the icon 13 and moves the hand with respect to the display screen, the icon 13 moves within an interface (e.g., a desktop) in accordance with the motion of the hand. However, in certain embodiments, it is also possible to determine that the pinching gesture corresponds to a scroll operation of the displayed interface.

In certain embodiments, the action performed resulting from the same gesture may vary depending on what object is being selected (e.g., pinched) by the action. For example, the same gesture may be interpreted as a drag action and a scroll action, with the distinguishing feature for determining which input operation is executed being the type of object (if any) selected prior to the gesture.

Moreover, it will be appreciated that hand gestures and/or feature points other than those described in the above examples may be utilized in various implementations of the present disclosure. For example, feature points may be determined for other points on the hand and/or other parts of the body, and the relative position between two or more of these feature points may be applied as the basis for determining which input operation should be executed. Further, feature points may be detected on objects that are not part of the human body. For example, a user may hold an arbitrary object in his or her hand, and feature points may be detected on this object for use in the processing methods described herein.

Moreover, the present disclosure describes various processing related to determining correspondences between predetermined input operations and variations in sequential position data related to a detected gesture. It should be understood that the term "variations" may be used to describe both the presence of variations in sequential position data, as well as the lack of variation between sequential position data.

Moreover, the present disclosure describes various processing performed when data included in the sequential position data is "substantially" the same at different times. Obviously, it is extremely difficult in practice to perform a gesture in which an object remains completely still, returns exactly to its initial position, etc. Accordingly, the present disclosure may be adapted such that a sufficient motion buffer is applied in order to determine when parameters are substantially the same. In certain implementations, a 5-10% motion deviation buffer may be applied. However, this value is not limiting, and actual buffer value may be selected based on sensor accuracy and other related factors.

The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices, e.g., display monitors, smart phones, tablets, personal digital assistants (PDAs). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A device comprising: a display; one or more motion sensors configured to track positions of two or more feature points of an object when the object is used to perform a gesture at a position remote from the display, and generate sequential position data based on the tracked positions of the feature points, wherein the sequential position data indicates a relative position of the feature points with respect to each other and to the display during a time period corresponding to the gesture; a memory that stores the sequential position data received from the one or more motion sensors; and circuitry configured to determine, based on the sequential position data, whether the gesture corresponds to one of a plurality of predetermined input operations, and execute processing related to the predetermined input operation when a correspondence between the gesture and the predetermined input operation is determined, wherein the circuitry is configured to determine whether the gesture corresponds to the predetermined input operation based on variations in the relative positions of the feature points with respect to each other and to the display.

(2) The device according to (1), wherein: the sequential position data includes coordinates of the feature points and a distance between the feature points during the time period corresponding to the gesture, and the circuitry is configured to determine whether the gesture corresponds to one of the predetermined input operations based on variations in the distance and at least one of the coordinates during the time period corresponding to the gesture.

(3) The device according to (1) or (2), wherein when the circuitry determines that the distance between the feature points remains substantially the same while the at least one of the coordinates is varied, the circuitry executes processing related to a first input operation, of the plurality of predetermined input operations.

(4) The device according to any one of (1) to (3), wherein: the first operation is a scroll operation, and when executing the processing related to the scroll operation, the circuitry controls the display such that a displayed element is scrolled on the display.

(5) The device according to any one of (1) to (4), wherein when the tracked positions of the two or more feature points exceed a detection range of the one or more motion sensors during the time period corresponding to the gesture, the circuitry is configured to temporarily suspend the processing related to the scroll operation.

(6) The device according to any one of (1) to (5), wherein the circuitry is configured to temporarily suspend the scroll operation at a time when the one or more motion sensors detect the positions of the two or more feature points exceed the detection range.

(7) The device according to any one of (1) to (6), wherein the circuitry is configured to resume the scroll operation when the one or more motion sensors subsequently detect that the positions of the feature points exceed a predetermined range relative to a spatial point where the detection range was initially exceeded.

(8) The device according to any one of (1) to (7), wherein when the circuitry determines that the distance between the feature points decreases and then subsequently increases while the coordinates of one of the feature points remain substantially the same, the circuitry executes processing related to a second input operation, of the plurality of predetermined input operations.

(9) The device according to any one of (1) to (8), wherein the second input operation is a click operation.

(10) The device according to any one of (1) to (9), wherein when the circuitry determines that a decrease in the distance between the feature points immediately precedes a change in the coordinates of both the feature points while the decreased distance is maintained substantially the same, the circuitry executes processing related to a third input operation, of the plurality of predetermined input operations.

(11) The device according to any one of (1) to (10), wherein the third input operation is a drag operation.

(12) The device according to any one of (1) to (11), wherein: the display outputs an interface including one or more display elements, the circuitry is configured to determine when one of the one or more of the display elements is selected for the dragging operation by determining that the coordinates of one of the feature points coincides with a corresponding display position of the display element for greater than a predetermined time threshold.

(13) The device according to any one of (1) to (12), wherein the feature points correspond to positions on a hand.

(14) The device according to any one of (1) to (13), wherein the feature points correspond to tips of two fingers on the hand.

(15) The device according to any one of (1) to (14), wherein the determination as to whether the gesture corresponds to one of the predetermined input operations is further based on a current operating state of the device.

(16) The device according to any one of (1) to (15), wherein when two of the plurality of predetermined input operations correspond to the same gesture, the circuitry is configured to determine which of the plurality of predetermined input operations to execute based on the current operating state of the device.

(17) The device according to any one of (1) to (16), wherein when two of the plurality of predetermined input operations correspond to the same gesture, the circuitry is configured to determine which of the plurality of predetermined input operations to execute based on an initial coordinate of the feature points at a start of the time period corresponding to the gesture.

(18) The device according to any one of (1) to (17), wherein when two of the plurality of predetermined input operations correspond to the same gesture and both of the predetermined input operations are available for execution in a currently active application, the circuitry is configured to assign a new gesture correspondence to one of the two predetermined input operations.

(19) A method of determining input operations for execution on an electronic device including a display, the method comprising: tracking, by one or more motion sensors, positions of two or more feature points of an object when the object is used to perform a gesture at a position remote from the display; generating, by the one or more motion sensors, sequential position data based on the tracked positions of the feature points, wherein the sequential position data indicates a relative position of the feature points with respect to each other and to the display during a time period corresponding to the gesture; storing, in a memory, the sequential position data received from the one or more motion sensors; determining, by circuitry, based on the sequential position data, whether the gesture corresponds to one of a plurality of predetermined input operations; and executing, by the circuitry, processing related to the predetermined input operation when a correspondence between the gesture and the predetermined input operation is determined, wherein the determination as to whether the gesture corresponds to the predetermined input operation is based on variations in the relative positions of the feature points with respect to each other and to the display.

(20) A non-transitory computer readable medium having instructions stored therein that when executed by one or more processors cause an electronic device including a display and one or more motion sensors to perform a method of determining input operations for execution on the electronic device, the method comprising: tracking, by the one or more motion sensors, positions of two or more feature points of an object when the object is used to perform a gesture at a position remote from the display; generating sequential position data based on the tracked positions of the feature points, wherein the sequential position data indicates a relative position of the feature points with respect to each other and to the display during a time period corresponding to the gesture; storing, in a memory, the sequential position data received from the one or more motion sensors; determining, based on the sequential position data, whether the gesture corresponds to one of a plurality of predetermined input operations; and executing processing related to the predetermined input operation when a correspondence between the gesture and the predetermined input operation is determined, wherein the determination as to whether the gesture corresponds to the predetermined input operation is based on variations in the relative positions of the feature points with respect to each other and to the display.

The invention claimed is:

1. A device comprising:
   one or more motion sensors configured to
      track positions of two or more fingers of a user's hand when the user's hand is used to perform a gesture at a position remote from the one or more motion sensors; and
      generate sequential position data based on the tracked positions of the fingers, wherein the sequential position data includes coordinates of the fingers and a distance between the fingers during a time period corresponding to the gesture;
   a memory that stores the sequential position data received from the one or more motion sensors; and
   circuitry configured to
      determine, based on the sequential position data, whether the gesture corresponds to one of a plurality of predetermined input operations;
      execute processing related to the predetermined input operation when a correspondence between the gesture and the predetermined input operation is determined;
      execute processing related to a scroll operation, of the plurality of predetermined input operations, when it is determined that the distance between the fingers remains substantially the same while at least one of the coordinates is varied; and
      temporarily suspend the processing related to the scroll operation when the distance between the fingers is decreased below a predetermined threshold distance while at least one of the coordinates is varied during the time period corresponding to the gesture.

2. The device according to claim 1, wherein:
the circuitry is configured to determine whether the gesture corresponds to one of the predetermined input operations based on variations in the distance and at least one of the coordinates during the time period corresponding to the gesture.

3. The device according to claim 1, wherein
the circuitry is configured to resume the scroll operation when the one or more motion sensors subsequently detect that the distance between the fingers exceed the predetermined threshold while at least one of the coordinates is varied during the time period corresponding to the gesture.

4. The device according to claim 2, wherein
when the circuitry determines that the distance between the fingers decreases and then subsequently increases while the coordinates of one of the fingers remain substantially the same, the circuitry executes processing related to a second input operation, of the plurality of predetermined input operations.

5. The device according to claim 4, wherein
the second input operation is a click operation.

6. The device according to claim 2, wherein
when the circuitry determines that a decrease in the distance between the fingers immediately precedes a change in the coordinates of both the fingers while the decreased distance is maintained substantially the same, the circuitry executes processing related to a third input operation, of the plurality of predetermined input operations.

7. The device according to claim 6, wherein
the third input operation is a drag operation.

8. The device according to claim 1, wherein
the determination as to whether the gesture corresponds to one of the predetermined input operations is further based on a current operating state of the device.

9. The device according to claim 8, wherein
when two of the plurality of predetermined input operations correspond to the same gesture, the circuitry is configured to determine which of the plurality of predetermined input operations to execute based on the current operating state of the device.

10. The device according to claim 1, wherein
when two of the plurality of predetermined input operations correspond to the same gesture, the circuitry is configured to determine which of the plurality of predetermined input operations to execute based on an initial coordinate of the fingers at a start of the time period corresponding to the gesture.

11. The device according to claim 1, wherein
when two of the plurality of predetermined input operations correspond to the same gesture and both of the predetermined input operations are available for execution in a currently active application, the circuitry is configured to assign a new gesture correspondence to one of the two predetermined input operations.

12. A method of determining input operations for execution on an electronic device, the method comprising:
tracking, by one or more motion sensors, positions of two or more fingers of a user's hand when the user's hand is used to perform a gesture at a position remote from the one or more motion sensors;
generating, by the one or more motion sensors, sequential position data based on the tracked positions of the fingers, wherein the sequential position data includes coordinates of the fingers and a distance between the fingers during a time period corresponding to the gesture;
storing, in a memory, the sequential position data received from the one or more motion sensors;
determining, by circuitry, based on the sequential position data, whether the gesture corresponds to one of a plurality of predetermined input operations;
executing, by the circuitry, processing related to the predetermined input operation when a correspondence between the gesture and the predetermined input operation is determined;
executing, by the circuitry, processing related to a scroll operation, of the plurality of predetermined input operations, when it is determined that the distance between the fingers remains substantially the same while at least one of the coordinates is varied; and
temporarily suspending, by the circuitry, the processing related to the scroll operation when the distance between the fingers is decreased below a predetermined threshold distance while at least one of the coordinates is varied during the time period corresponding to the gesture.

13. A non-transitory computer readable medium having instructions stored therein that when executed by one or more processors cause an electronic device including one or more motion sensors to perform a method of determining input operations for execution on the electronic device, the method comprising:
tracking, by the one or more motion sensors, positions of two or more fingers of a user's hand when the user's hand is used to perform a gesture at a position remote from the one or more motion sensors;
generating sequential position data based on the tracked positions of the fingers, wherein the sequential position data includes coordinates of the fingers and a distance between the fingers during a time period corresponding to the gesture;
storing, in a memory, the sequential position data received from the one or more motion sensors;
determining, based on the sequential position data, whether the gesture corresponds to one of a plurality of predetermined input operations;
executing processing related to the predetermined input operation when a correspondence between the gesture and the predetermined input operation is determined;
executing processing related to a scroll operation, of the plurality of predetermined input operations, when it is determined that the distance between the fingers remains substantially the same while at least one of the coordinates is varied; and
temporarily suspending the processing related to the scroll operation when the distance between the fingers is decreased below a predetermined threshold distance while at least one of the coordinates is varied during the time period corresponding to the gesture.

* * * * *